United States Patent
Niihara et al.

(10) Patent No.: US 7,323,432 B2
(45) Date of Patent: Jan. 29, 2008

(54) CATALYST ASSEMBLY

(75) Inventors: Koichi Niihara, Osaka (JP); Tadachika Nakayama, Osaka (JP); Jun Hasegawa, Kariya (JP); Miho Ito, Kariya (JP)

(73) Assignees: DENSO Corporation, Kariya (JP); Koichi Niihara, Osaka (JP); Tadachika Nakayama, Osaka (JP)

( * ) Notice: Subject to any disclaimer, the term of this patent is extended or adjusted under 35 U.S.C. 154(b) by 609 days.

(21) Appl. No.: 10/646,542

(22) Filed: Aug. 21, 2003

(65) Prior Publication Data
US 2005/0090387 A1 Apr. 28, 2005

(30) Foreign Application Priority Data
Aug. 22, 2002 (JP) ............... 2002-241846

(51) Int. Cl.
*B01J 23/00* (2006.01)
*B01J 21/00* (2006.01)
*B01J 20/00* (2006.01)
*B01J 27/00* (2006.01)

(52) U.S. Cl. ............... 502/300; 502/178; 502/200; 502/240; 502/258; 502/262; 502/302; 502/304; 502/326; 502/327; 502/332; 502/334; 502/339; 502/349; 502/355; 502/439; 502/407; 502/415; 502/527.12; 502/527.14

(58) Field of Classification Search ............... 502/302, 502/303, 304, 300, 326–327, 349, 439, 178, 502/332, 334, 339, 355, 407, 527.12, 527.14
See application file for complete search history.

(56) References Cited

U.S. PATENT DOCUMENTS 3,929,671 A * 12/1975 Nakamura et al. .......... 502/241
3,956,185 A * 5/1976 Yagi et al. .................. 502/241
3,992,498 A * 11/1976 Morton et al. .............. 264/639
4,749,671 A * 6/1988 Saito et al. .................. 502/64
5,256,451 A * 10/1993 Philipp et al. ........... 427/374.2
5,395,654 A * 3/1995 Philipp et al. ........... 427/376.6
5,540,981 A * 7/1996 Gallagher et al. .......... 428/220
5,723,403 A * 3/1998 Durand et al. .............. 502/304
5,801,114 A * 9/1998 Durand et al. .............. 502/302
6,156,685 A * 12/2000 Marella et al. ............ 501/95.1
6,310,431 B1 * 10/2001 Blanchet-Fincher et al. .......... 313/311
6,758,957 B1 * 7/2004 Zhou et al. ................. 205/109
2002/0131914 A1 * 9/2002 Sung ......................... 422/177
2002/0177032 A1    11/2002 Suenaga et al.

(Continued)

FOREIGN PATENT DOCUMENTS

EP    0 211 233 A1 * 2/1987
EP    0 407 915 A2 * 1/1991

(Continued)

*Primary Examiner*—Cam N. Nguyen
(74) *Attorney, Agent, or Firm*—Harness, Dickey & Pierce, PLC

(57) ABSTRACT

A catalyst assembly comprising a substrate, nanofilaments which have a nanometer-size diameter and are formed on the substrate, and particles which have a nanometer-size diameter, at least one of the nanofilaments and the particles having a catalytic function, is provided to use a catalyst more efficiently and to provide a catalytic function more efficiently. Interstices between the nanofilaments serve as distribution channels of a reactive gas, and the reactive gas spreads sufficiently not only around the ends of nanofilaments but also inside a catalyst assembly. A combination of nanofilaments and particles enables dispersion of a catalyst at a distance of not more than about 100 nanometers.

17 Claims, 1 Drawing Sheet

U.S. PATENT DOCUMENTS

| | | | |
|---|---|---|---|
| 2003/0096880 A1* | 5/2003 | Wang et al. | 518/714 |
| 2003/0135971 A1* | 7/2003 | Liberman et al. | 29/419.1 |
| 2005/0039765 A1* | 2/2005 | Zhang | 131/301 |

FOREIGN PATENT DOCUMENTS

| | | |
|---|---|---|
| JP | 2-261546 | 10/1990 |
| JP | 2002-298861 | 10/2002 |

* cited by examiner

CATALYST ASSEMBLY

BACKGROUND OF THE INVENTION

1. Field of the Invention

The present invention relates to a catalyst assembly comprising a catalyst supported on a substrate and, especially, it relates to a catalyst assembly suitable for purifying an automobile exhaust gas.

2. Description of the Related Art

For example, a catalyst assembly for purifying an automobile exhaust gas comprising a cordierite carrier as a substrate and a noble metal as a catalyst supported on the carrier is known but, as the bonding strength to a noble metal is weak, the cordierite in itself cannot support a sufficient amount of a noble metal.

Therefore, conventionally, γ-alumina having a large specific surface area is supported, to a thickness of tens of micrometers, on a surface of cordierite, and catalyst particles are supported on the γ-alumina by the use of physical adsorption on this large surface area. Sometimes only particles having a catalytic function are supported, and sometimes a co-catalyst or particles having an occlusion function may be also supported in addition to catalyst particles as in a three-way catalyst for automobiles or a $NO_x$ occlusion reduction catalyst.

When a catalyst is supported on γ-alumina, the catalyst is supported not only on a surface of γ-alumina layer but also inside porous γ-alumina particles and between the particles. In this case, a catalyst supported on the surface works well, but there is a problem that a catalyst inside the γ-alumina particle does not work well because diffusion of a reactive gas to the inside of the particle is slow.

For this reason, it was necessary to support much more catalyst than a necessary minimum amount in order to attain the required purification.

When supporting two or more kinds of particles having different functions, such as a catalytic function and a co-catalytic function, it is preferable that the particles are adjacent to each other. However, if a catalyst particle is supported on γ-alumina, as γ-alumina exists also between each particle, there was a problem that the particles are adjacent to each other with a low probability and do not function sufficiently.

As there are problems that an amount of used catalyst was too high, a catalyst did not function sufficiently and so on, it is desired to use a catalyst more efficiently and make a catalytic function more efficient.

SUMMARY OF THE INVENTION

The present invention aims at providing a catalyst assembly which has an increased catalyst efficiency and also can provide a more sufficient catalytic function in view of the above-mentioned problem.

In order to attain the above-mentioned aim, the inventors paid attention to sufficiently securing a diffusion channel for gas, increasing the percentage of catalysts which work effectively even if the amount of the catalysts is the same, highly dispersing particles having catalyst and co-catalyst functions in the range of nanometers (not more than about 100 nanometers) and smaller than before, thus increasing the probability that particles are adjacent to each other, and increasing the number of active sites.

The present invention includes a catalyst assembly comprising a substrate, nanofilaments which have a nanometer-size diameter and are formed on the substrate, and particles which have a nanometer-size diameter, at least one of the nanofilaments and the particles having a catalytic function.

DETAILED DESCRIPTION OF THE INVENTION

Figure 1:
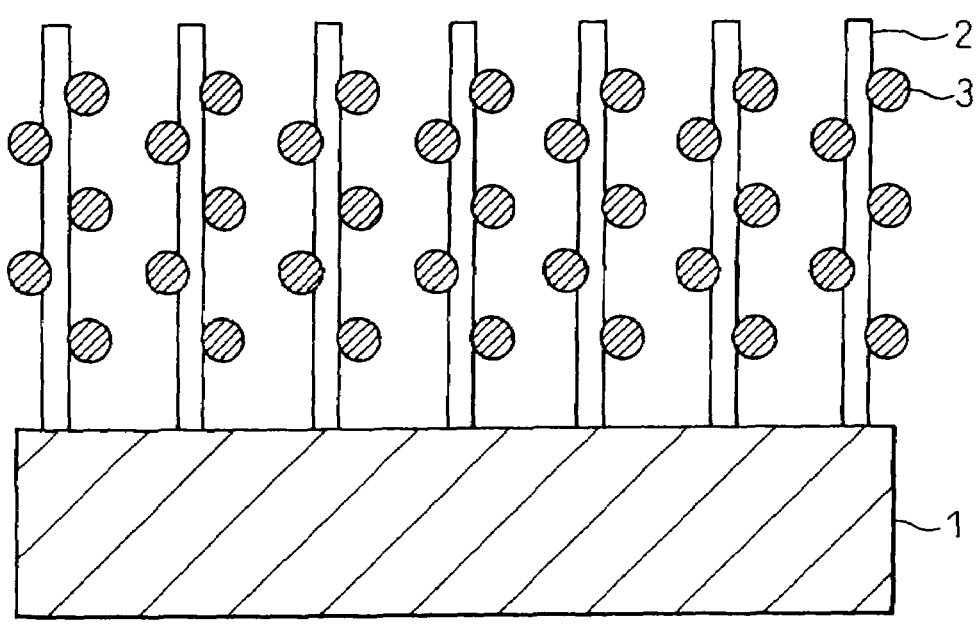
FIG. 1 illustrates the structure of a catalyst assembly of an example of the present invention.

A catalyst assembly of the present invention comprises a substrate 1, nanofilaments 2 which have a nanometer-size diameter and are formed on the substrate 1, and particles 3 which have a nanometer-size diameter, at least one of the nanofilaments 2 and the particles 3 having a catalytic function. In the present invention, "nanometer-size" means to be not more than about 100 nanometers.

In FIG. 1, nanofilaments 2 grow up from a surface of the substrate 1, and nanofilaments 2 protrude from a surface of a substrate 1. Particles 3 are supported on nanofilaments 2. Furthermore, particles 3 may be supported not on nanofilaments 2 but on a substrate 1, and particles 3 may be supported both on nanofilaments 2 and on a substrate 1.

A substrate 1 is a carrier supporting nanofilaments 2, and it may also be a carrier supporting particles 3 as well as nanofilaments 2. A substrate may have any shape such as plate, honeycomb, particle, stick, and the like. Nanofilaments 2 may be a carrier supporting particles 3, and it may have a catalytic or co-catalytic function. When nanofilaments 2 do not support particles 3, nanofilaments 2 may have only a catalytic or co-catalytic function.

Nanofilaments 2 preferably have a diameter of from 1 to 200 nanometers, more preferably of from 5 to 100 nanometers, and they preferably have an aspect ratio of no less than 10 in order for them to be dispersed at a distance of not more than about 100 nanometers and be arranged three-dimensionally.

In order to optimize space density inside a catalyst assembly and to secure distribution channels for a gas and a configuration space for particles 3 having a nanometer-size diameter, it is preferred that nanofilaments 2 are arranged at intervals of from 2 to 200 nanometers, more preferably from 2 to 100 nanometers.

At least one of the nanofilaments 2 and the particles 3 have a catalytic function. When the particles 3 have a catalytic function, the nanofilaments 2 may have no catalytic function or they may have a co-catalytic function or a catalytic function. When the nanofilaments 2 have a catalytic function, the particles 3 may have a co-catalytic function or a catalytic function.

Particles 3 having a co-catalytic function may exist together with particles 3 having a catalytic function. Particles 3 having a catalytic function preferably have a diameter of from 0.5 to 50 nanometers, more preferably of from 0.5 to 30 nanometers, in order to be dispersed at a distance of not more than about 100 nanometers. Particles 3 having a co-catalytic function preferably have a diameter of from 0.5 to 50 nanometers in order to be dispersed in the same range as particles 3 having a catalytic function.

As a material forming a substrate 1 or nanofilaments 2, a metal oxide, a metal nitride, a metal carbide, a metal, an intermetallic compound, an oxide, nitride, or carbide of silicon, an ally or solid solution thereof, and the like can be used. Specific examples thereof are at least one selected from the group consisting of cordierite, alumina, silica, zirconia, ceria, silicon carbide, silicon nitride, titania, tin oxide, iron oxide, manganese oxide, zinc oxide, copper oxide, zeolite, carbon, Si, Au, Ag, Co, Fe, Zn, Ni, or a solid solution thereof.

Examples of a material having a catalytic function used for particles 3 or nanofilaments 2 include a metal, a metal oxide, a metal sulfide, and the like. Specific examples of the metal are at least one selected from the group consisting of Pt, Rh, Pd, Ir, Ru, Au, Ag, Re, Os, Co, Ni, Fe, Cu, Mn, Cr, V, Mo and W, or a solid solution thereof. Examples of the metal oxide include an oxide of Pt, Rh, Pd, Ir, Ru, Au, Ag, Re, Os, Co, Ni, Fe, Cu, Mn, Cr, V, Mo or W, and specific examples thereof include PdO, $CO_3O_4$, $Cr_2O_3$, $Mn_2O_3$, CuO, $CeO_2$, $Fe_2O_3$, $V_2O_5$, PtO, and the like. Examples of the metal sulfide include $MoS_2$ and the like.

Examples of a material having a co-catalytic function used for particles 3 or nanofilaments 2 include a material having a function of adsorbing and desorbing oxygen, and a material having a function of adsorbing and desorbing VOC (volatile organic compound), a hydrocarbon, $NO_x$, $SO_x$, CO and the like physically or chemically.

Specific examples of a material having a function of adsorbing and desorbing oxygen among materials having a co-catalytic function include an oxide of Ce, Zr or Y, and a solid solution thereof. More specifically, cerium oxide ($CeO_2$) has a function of adsorbing and desorbing oxygen, and an oxide of Zr, Y or La has a function of promoting adsorption and desorption of oxygen.

Nanofilaments composed of a material having a function of adsorbing and desorbing oxygen have the following advantage; by using a catalyst assembly of the present invention for an automobile exhaust gas purifying device, during combustion at an air-fuel ratio of lean side where much oxygen remains in an exhaust gas, a part of remaining oxygen is adsorbed by nanofilaments, and therefore a function of purifying an automobile exhaust gas by reduction can be activated. On the other hand, during combustion at an air-fuel ratio of rich side where little oxygen remains in an exhaust gas, oxygen is desorbed from nanofilaments, and therefore a function of purifying an automobile exhaust gas by oxidation can be activated.

Examples of a material having a physical adsorbing function among materials having a co-catalytic function include a porous material such as a zeolite, a mesoporous silica, an active carbon, and the like. Examples of a material having a chemically adsorbing function include compounds of an alkali metal or alkaline earth metal such as K, Ba, and the like.

Examples of a method of preparing particles 3 which has a nanometer-size diameter include a coprecipitation method, a sol-gel method, a plating method, and the like. Examples of a method of preparing nanofilaments 2 include CVD (chemical vapor deposition), PVD (physical vapor deposition), and the like.

A catalyst assembly of the present invention comprises a substrate 1, nanofilaments 2 which have a nanometer-size diameter and are formed on the substrate 1, and particles 3 which have a nanometer-size diameter, at least one of the nanofilaments 2 and the particles 3 having a catalytic function.

According to the invention, interstices between nanofilaments 2 serve as distribution channels of a reactive gas, and the efficiency of a catalyst is improved because the reactive gas spreads sufficiently not only around the ends of nanofilaments but also inside a catalyst assembly.

When using a catalyst assembly, for example, for purifying an automobile exhaust gas, if the flow rate of gas passing through the catalyst assembly is high and a flow in the catalyst assembly is a laminar flow, a reactive gas or an exhaust gas reaches a surface of catalyst only by diffusion in a conventional catalyst assembly.

On the other hand, in a catalyst assembly comprising nanofilaments 2 formed on a substrate 1 and catalyst particles 3 supported thereon like the present invention, a flow is disturbed by nanofilaments 2 and a turbulent flow arises, whereby the gas is effectively agitated in addition to diffusion and, therefore, the gas spreads throughout the catalyst assembly, and the efficiency of purification increases.

A combination of nanofilaments 2 and particles 3, which both have a nanometer-size diameter, enables dispersion of a catalyst at a distance of not more than about 100 nanometers. Therefore, when nanofilaments 2 and particles 3 have different functions, for example, one is a catalyst and the other is a co-catalyst, the catalyst and the co-catalyst can be adjacent to each other, whereby active sites increase and the catalyst can function sufficiently.

Thus, according to the present invention, a catalyst assembly which has an increased efficiency and also can provide a catalytic function more sufficiently can be provided.

A catalyst assembly of the present invention can be used in various fields such as exhaust gas purification, environmental cleanup, a fuel cell, and the like.

EXAMPLES

The following examples illustrate the present invention, but the scope of invention is not limited by the following examples.

Example 1

A mixed powder of Si and $SiO_2$ having an atomic ratio of 70:30 was put on an alumina boat, and the boat was placed in the center of a silica tube and was heated at a temperature of 1200 degrees centigrade for 5 hours while argon gas containing one percent of oxygen flowed from one end of the silica tube. $SiO_2$ nanofilaments were produced on the surface of a cordierite honeycomb, as a substrate, placed downstream.

The inventors think this is because a $SiO_2$ crystal grows selectively along the direction of a crystal face where crystal energy is the most stable when $SiO_2$ is evaporated by heating and is deposited physically on a cordierite.

TEM analysis showed that the nanofilaments had an average diameter of 10 nanometers and were formed at intervals of about 50 nanometers.

The resulting cordierite honeycomb with nanofilaments growing on the surface of the honeycomb was impregnated with a solution of chloroplatinic acid having a concentration of 2.5 mmol/L, and then was dried and heated at a temperature of 600 degrees centigrade, whereby platinum particles having a diameter of about one nanometer as particles 3 were deposited on the surfaces of honeycomb and nanofilaments to obtain a catalyst assembly.

Example 2

A mixed powder of $SiO_2$, MgO and $Al_2O_3$ having a weight ratio of 51.4:13.7:34.9 was put on an alumina boat, and the boat was placed in the center of a silica tube and was heated at a temperature of 1500 degrees centigrade for 5 hours while argon gas containing one percent of oxygen flowed from one end of the silica tube. Cordierite nanofilaments were produced on the surface of a cordierite honeycomb, as a substrate, placed downstream.

TEM analysis showed that the nanofilaments had an average diameter of 30 nanometers and were formed at intervals of about 100 nanometers.

The honeycomb was impregnated with a solution of chloroplatinic acid having a concentration of 2.5 mmol/L, and then was dried and heated at a temperature of 600 degrees centigrade, whereby platinum particles having a diameter of about one nanometer as particles 3 were deposited on the surfaces of honeycomb and nanofilaments to obtain a catalyst assembly.

Example 3

An $Al_2O_3$ substrate was placed in the center of a silica tube, and ferrocene vapor was passed, with $H_2$, through the tube during heating at a temperature of 600 degrees centigrade, and Fe nanoparticles were deposited by reduction on the surface of the substrate. These Fe nanoparticles would be used as nuclei for growth of SiC nanofilaments produced later.

Thereafter, $SiCl_4/C_6H_6/H_2/Ar$ gas was passed through the tube, and was reacted at a temperature of 900 degrees centigrade for 30 minutes, whereby SiC nanofilaments were produced on the $Al_2O_3$ substrate.

TEM analysis showed that the nanofilaments had an average diameter of 10 nanometers and were formed at intervals of about 50 nanometers.

The resulting substrate with nanofilaments was impregnated with a solution of chloroplatinic acid having a concentration of 2.5 mmol/L and, like Examples 1 and 2, platinum particles having a diameter of about one nanometer as particles 3 were deposited on the surfaces of substrate and nanofilaments to obtain a catalyst assembly.

Example 4

Zn powder and Au nanoparticles were mixed on a cordierite carrier as a substrate, and were superheated under oxidizing atmosphere to obtain ZnO nanofilaments on the substrate.

TEM analysis showed that the nanofilaments had an average diameter of 80 nanometers and were formed at intervals of about 200 nanometers.

Pt nanoparticles were deposited, as in Example 1, to obtain a catalyst assembly comprising nanofilaments having a photocatalytic function and a nanoparticle catalyst.

Example 5

A $CeO_2$ substrate was heated in Ar gas, and ceria nanofilaments were formed on the substrate.

TEM analysis showed that the nanofilaments had an average diameter of 50 nanometers and were formed at intervals of about 200 nanometers.

As in Example 1, Pt nanoparticles were deposited to obtain a catalyst assembly, which can be used as a three-way catalyst for purifying an automobile exhaust gas.

Example 6

A cordierite honeycomb as a substrate was put in a reactor tube, and a vapor generated by heating Ce and Zr was passed, with $Ar/O_2$ gas, from one end of the reactor tube to react at a temperature of 1400 degrees centigrade for 60 minutes. Thereby, nanofilaments of a $CeO_2/ZrO_2$ solid solution were formed on the surface of the cordierite honeycomb.

TEM analysis showed that the nanofilaments had an average diameter of 40 nanometers and were formed at intervals of about 150 nanometers.

The resulting honeycomb with nanofilaments was impregnated with a solution of chloroplatinic acid having a concentration of 2.5 mmol/L, and then was dried and heated at a temperature of 600 degrees centigrade for 5 hours, whereby platinum particles having a diameter of about one nanometer, as particles 3, were deposited on the nanofilaments. In addition, the resulting honeycomb with platinum particles deposited was impregnated in a solution of chlororhodic acid having a concentration of 0.5 mmol/L, and then dried and heated in the same way. Thus, rhodium particles having a diameter of about one nanometer, as particles 3, were deposited on the nanofilaments to obtain a catalyst assembly comprising two kinds of particles, which can be used as a three-way catalyst for purifying an automobile exhaust gas.

What is claimed is:

1. An automobile exhaust gas purifying device comprising a catalyst assembly comprising a substrate, nanofilaments which have a nanometer-size diameter and are formed on the substrate, and particles which have a nanometer-size diameter of not more than approximately 100 nanometers, at least one of the nanofilaments and the particles having a catalytic function; wherein the nanofilaments extend from a surface of the substrate; and the particles are supported on the nanofilament.

2. An automobile exhaust gas purifying device according to claim 1, wherein adjacent nanofilaments have an interval of from 2 to 200 nanometers.

3. An automobile exhaust gas purifying device according to claim 1, wherein adjacent nanofilaments have an interval of from 2 to 100 nanometers.

4. An automobile exhaust gas purifying device according to claim 1, wherein the particles have a diameter of from 0.5 to 50 nanometers.

5. An automobile exhaust gas purifying device according to claim 1, wherein the nanofilaments extend generally perpendicular from a surface of the substrate.

6. An automobile exhaust gas purifying device according to claim 1, wherein the substrate is in the shape of a plate, honeycomb, particle, or stick.

7. An automobile exhaust gas purifying device according to claim 1, wherein the substrate comprises at least one selected from the group consisting of an oxide, a nitride, a carbide of a metal or silicon, and a solid solution thereof.

8. An automobile exhaust gas purifying device according to claim 1, wherein the particles have a catalytic function.

9. An automobile exhaust gas purifying device according to claim 8, wherein the nanofilaments comprise a material having a co-catalytic function.

10. An automobile exhaust gas purifying device according to claim 9, wherein the material has a function for adsorbing and desorbing oxygen.

11. An automobile exhaust gas purifying device according to claim 8, wherein the nanofilaments comprise an oxide of cerium, zirconium or yttrium, or a solid solution thereof.

12. An automobile exhaust gas purifying device according to claim 8, wherein the nanofilaments comprise $CeO_2$, $ZrO_2$ or $Y_2O_3$.

13. An automobile exhaust gas purifying device according to claim 8, wherein the nanofilaments comprise $CeO_2$.

14. An automobile exhaust gas purifying device according to claim 1, wherein the particles comprise at least one selected from the group consisting of a metal, a metal oxide and a metal sulfide.

15. An automobile exhaust gas purifying device according to claim 1, wherein the particles comprise platinum.

16. An automobile exhaust gas purifying device according to claim 1, wherein the particles comprise platinum and the nanofilaments comprise $CeO_2$ or a solid solution of $CeO_2$ and $ZrO_2$.

17. An automobile exhaust gas purifying device according to claim 1, wherein the catalytic function comprises purifying an automobile exhaust gas.

* * * * *